United States Patent [19]
Hotta et al.

[11] Patent Number: 5,935,037
[45] Date of Patent: Aug. 10, 1999

[54] PLANETARY GEAR TRANSMISSION

[75] Inventors: Takashi Hotta; Takamichi Shimada, both of Utsunomiya, Japan

[73] Assignee: Honda Giken Kogyo Kabushiki Kaisha, Tokyo, Japan

[21] Appl. No.: 09/113,193

[22] Filed: Jul. 10, 1998

[30] Foreign Application Priority Data

Aug. 28, 1997 [JP] Japan .................................... 9-233018

[51] Int. Cl.⁶ ...................................................... F16D 3/66
[52] U.S. Cl. .......................... 475/286; 475/290; 475/275
[58] Field of Search ..................................... 475/286, 290, 475/275, 276, 279, 317, 323, 343, 302

[56] References Cited

U.S. PATENT DOCUMENTS

| | | | |
|---|---|---|---|
| 3,739,647 | 6/1973 | Crooks | 475/286 X |
| 3,915,033 | 10/1975 | Polak | 475/286 X |
| 3,996,817 | 12/1976 | Winzeler | 475/286 X |
| 4,719,985 | 1/1988 | Zaiser | 475/276 X |
| 5,106,352 | 4/1992 | Lepelletier | 475/286 X |
| 5,226,862 | 7/1993 | Hattori | 475/286 |
| 5,267,913 | 12/1993 | Beim et al. | 475/286 X |
| 5,277,673 | 1/1994 | Nakayama et al. | 475/276 X |
| 5,503,605 | 4/1996 | Beim | 475/275 X |
| 5,690,579 | 11/1997 | Takeda et al. | 475/285 X |

FOREIGN PATENT DOCUMENTS

| | | |
|---|---|---|
| 59-222644 | 12/1984 | Japan . |
| 1-320361 | 12/1989 | Japan . |
| 4-125345 | 4/1992 | Japan . |

*Primary Examiner*—Dirk Wright
*Assistant Examiner*—Peter T. Kwon
*Attorney, Agent, or Firm*—Armstrong, Westerman, Hattori, McLeland & Naughton

[57] ABSTRACT

A planetary gear transmission comprises first, second and third planetary gear trains G1, G2 and G3 which are disposed coaxially with one another and respectively in this order from an input member. The first and second ring gears R1 and R2, which are fixedly retainable by a first brake B1, are disengageably connected to the input shaft 1 through a first clutch K1. The first sun gear S1 is also disengageably connected to the input shaft 1 through a third clutch while the first carrier C1 and the second sun gear S2 are connected to the output shaft 7. Furthermore, a connecting shaft 4 is disposed away from and in parallel with the axis of the first, second and third planetary gear trains G1, G2 and G3, and one end of the connecting shaft is connected to the input shaft 1 through a first connecting gear train 2 and 3 while the other end of the connecting shaft is connected to the third sun gear S3 through a second connecting gear train 5 and 6.

6 Claims, 7 Drawing Sheets

| Speed range | K1 | K2 | K3 | B1 | B2 | Gear ratio |
|---|---|---|---|---|---|---|
| LOW | | | O | O | | 3.645 |
| 2nd | | | O | | O | 2.116 |
| 3rd | | O | O | | | 1.478 |
| 4th | O | | O | | | 1.000 |
| 5th | O | O | | | | 0.691 |
| REV | | O | | O | | -3.542 |

|   | Rotating members | | | | | | λ |
|---|---|---|---|---|---|---|---|
|   | First | Second | Third | Fourth | Fifth | Sixth |   |
| G3 | C3 | R3 |   |   | S3 |   | 0.45 |
| G2 |   | C2 | R2 | S2 |   |   | 0.57 |
| G1 |   |   | R1 | C1 |   | S1 | 0.39 |

# PLANETARY GEAR TRANSMISSION

RELATED APPLICATIONS

This application claims the priority of Japanese Patent Application No.9-233018 filed on Aug. 28, 1998, which is incorporated herein by reference.

FIELD OF THE INVENTION

The present invention relates to a planetary gear transmission having three coaxially disposed planetary gear trains.

BACKGROUND OF THE INVENTION

A planetary gear transmission which comprises a combination of two planetary gear trains such as Ravigneaux gear train and Simpson gear train, has been well known in the prior art. Although this type of planetary gear transmission is generally designed with four forward gear positions or four speed ranges, some transmissions are constructed with five gear positions since there is demand for more speed ranges to improve vehicular traveling performance.

As such a transmission which provides an additional speed range, a planetary gear transmission comprising three planetary gear trains is disclosed, for example, in Japanese Laid-Open Patent Publication No. 59(1984)-222644 or in Japanese Laid-Open Patent Publication No. 1(1989)-320361. In this type of transmission, the planetary gear trains are combined with three or four clutches and three brakes (these clutches and brakes are referred to as "engaging means") so that, by controlling the actuation of the clutches and brakes in combination, the planetary gear transmission is made capable of providing five forward gear positions and one reverse gear position. However, this type of transmission has a few disadvantages: the size and construction of the transmission is relatively large and complex as it requires a number of engaging elements (clutches and brakes) for establishing the respective speed ranges; the efficiency of power transmission is often reduced by the rotational resistance of the engaging elements used; and the pinion gears (or the gears which are supported on the carriers) of the planetary gears may experience over-rotation.

Therefore, the applicant of the present invention has proposed a transmission which is disclosed in Japanese Laid-Open Patent Publication No. 4(1992)-125345. This transmission comprises three coaxially disposed planetary gear trains and five engaging means (three clutches and two brakes) to achieve a relatively small size, to improve the power transmission efficiency, and to prevent the pinion gears from over-rotation.

However, in this transmission, the practical range of gear ratio for the components (a sun gear, a carrier, pinion gears and a ring gear) of each planetary gear is substantially limited by the relatively small size of the respective planetary gear. In addition, the gear ratio (or speed ratio) for each speed range is limited within a certain range because a change made to the gear ratio of any one of the planetary gear trains can affect the gear ratios of all the speed ranges. Thus, there is a problem that the degree of freedom in determining the gear ratios are relatively small.

SUMMARY OF THE INVENTION

The present invention is to solve the above mentioned problem. Thus, it is an object of the present invention to provide a planetary gear transmission which comprises a minimum number of engaging means such as clutches and brakes and yet achieves a high efficiency in power transmission.

It is another object of the present invention to provide a planetary gear transmission which eliminates the problem of pinion gear over-rotation.

It is yet another object of the present invention to provide a planetary gear transmission which offers a large degree of freedom in determining gear ratios.

In order to achieve these objectives, the present invention provides a planetary gear transmission comprising first, second and third planetary gear trains which are disposed coaxially with one another and respectively in this order from an input member, each planetary gear train including a sun gear element, a carrier element and a ring gear element. In this transmission, two elements of the first planetary gear train are each disengageably connected to the input member through clutching means while the sun gear element of the second planetary gear train is fixed to an output member. Furthermore, a connecting shaft is provided away from and in parallel with the axis of the first, second and third planetary gear trains, and one end of the connecting shaft is connected to the input member through a first connecting gear train while the other end of the connecting shaft is connected to the sun gear element of the third planetary gear train through a second connecting gear train.

With this planetary gear transmission, the degree of freedom in determining the reduction gear ratios for a plurality of speed ranges is substantially improved because of the construction which enables the rotation of the input member to be transmitted to either of the two elements of the first planetary gear train through one of the two clutching means involved respectively or transmitted to the connecting shaft, which is disposed parallel to the planetary gear trains.

For the sake of clarity, if the elements composing the first, second and third planetary gear trains are named, first, second and third sun gear elements, first, second and third carrier elements and first, second and third ring gear elements, respectively, then preferably the planetary gear transmission is constructed in the following manner. The first and second ring gear elements are fixed to each other, and they are disengageably connected to the input member through first clutching means while they are fixedly retainable by first braking means. The second carrier element is disengageably connected to the third ring gear element through second clutching means while it is fixedly retainable by second braking means. Furthermore, the first sun gear element is disengageably connected to the input member through third clutching means, and the first carrier element is fixed to the output member while the third carrier element is fixed stationary.

Alternatively, the planetary gear transmission may be constructed in the following manner. The first carrier element and the second ring gear element are fixed to each other, and they are disengageably connected to the input member through first clutching means while they are fixedly retainable by first braking means. The second carrier element is disengageably connected to the third ring gear element through second clutching means while it is made fixedly retainable by second braking means. Furthermore, the first sun gear element is disengageably connected to the input member through third clutching means, and the first ring gear element is fixed to the output member while the third carrier element is fixed stationary.

In these designs, the rotation of the input member is transmitted to the third sun gear element through the connecting shaft, and it is varied in the third planetary gear train to be transmitted to the third ring gear element. From the third ring gear element, this varied rotation is further transmitted through the second clutching means to the first and second planetary gear trains, in which the transmitted rotation is further varied to establish a plurality of speed ranges. In other words, the third planetary gear train acts like a speed change gear train because it is independent of the first and second planetary gear trains. The third planetary gear train, which acts independently, prevents the pinion gears, which are parts of the planetary gear trains, from experiencing over- rotation. Furthermore, as the gear ratio of the third planetary gear train is determinable independently from the first and second planetary gear trains, there is a relatively large degree of freedom in deciding the reduction gear ratios.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figures 1, 5:
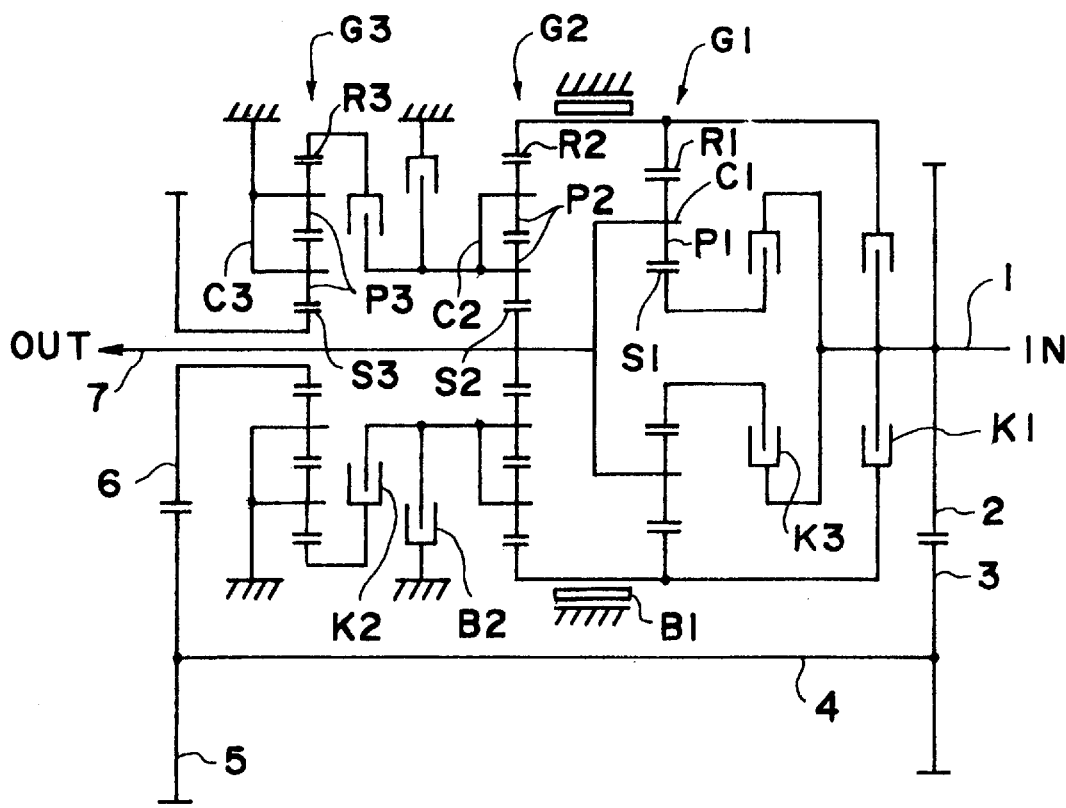
FIG. 1 is a skeleton diagram showing the power transmission routes of a planetary gear transmission according to the present invention.
FIG. 5 is a table showing the relation of the engagement of clutches and brakes to the establishment of speed ranges in the planetary gear transmission.
Figure 2:
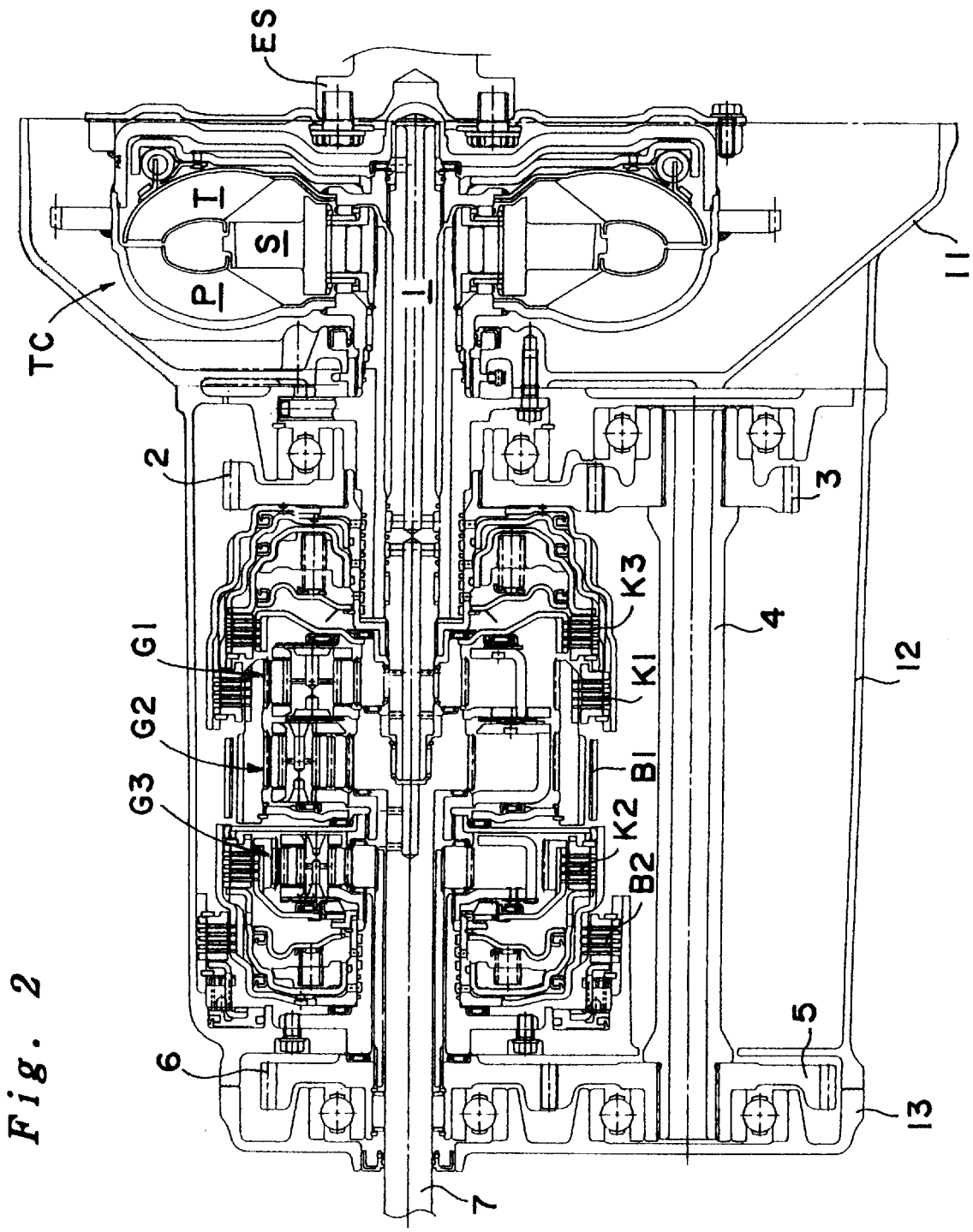
FIG. 2 is a sectional view showing the overall construction of the planetary gear transmission.
Figure 3:
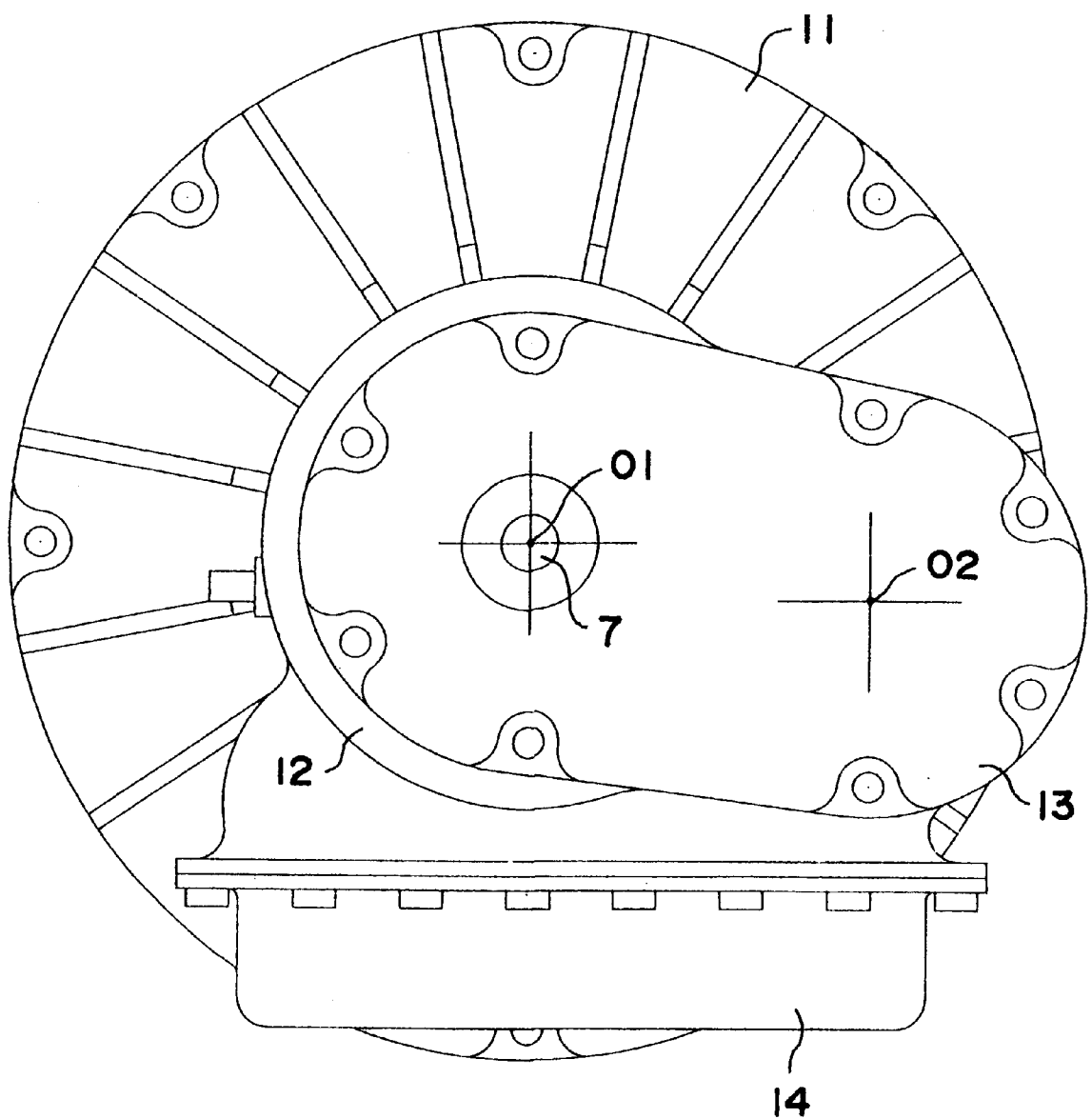
FIG. 3 is a side view showing the overall construction of the planetary gear transmission.
Figure 4:
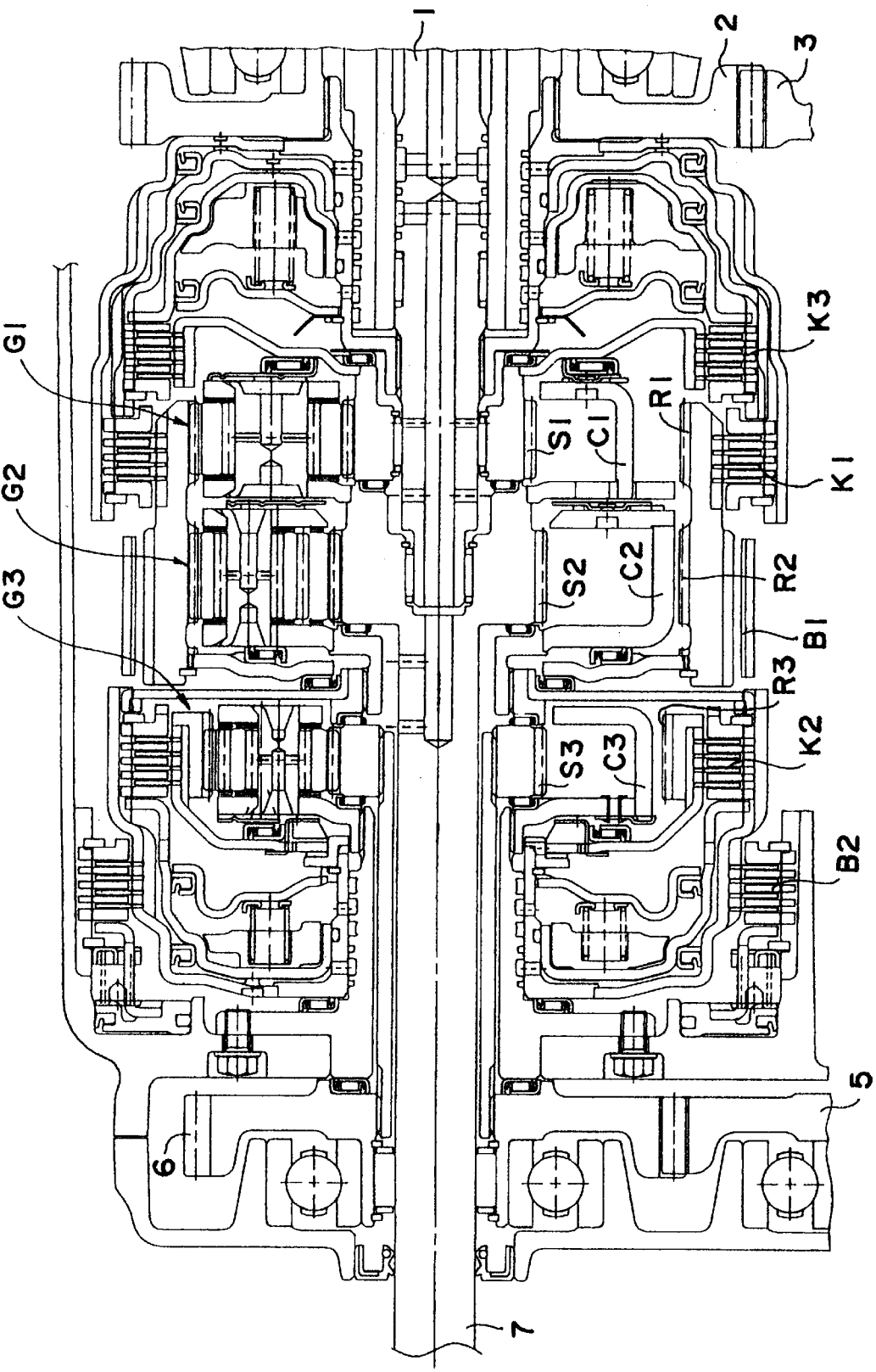
FIG. 4 is an enlarged sectional view showing the speed change mechanism of the planetary gear transmission.

Now, preferred embodiments of the present invention will be described with reference to the drawings. An specific example of the planetary gear transmission according to the present invention is shown in FIGS. 2 through 4, and the power transmission routes of the transmission is illustrated schematically in FIG. 1. This transmission includes first, second and third housings 11, 12 and 13 which are combined to form an overall housing. In the first housing 11, a torque converter TC is provided, and in the space defined in the second and third housings 12 and 13, a speed change mechanism is provided. Basically, the transmission comprises first, second, and third planetary gear trains G1, G2, and G3, which are disposed coaxially with, in parallel with and adjacent to one another; a connecting shaft 4, which extends parallel with the axis of the planetary gear trains; a first connecting gear train 2 and 3 which is provided at one end of the connecting shaft 4; and second connecting gear train 5 and 6 which is provided at the other end of the connecting shaft 4.

The torque converter TC comprises a pump P, which is connected to the output shaft ES of an engine; a fixedly retained stator S; and a turbine T, which is disposed opposite to the pump P and is connected to the input shaft 1 of the transmission. The output shaft 7 of the transmission is disposed coaxially with the input shaft 1 and opposite to the torque converter TC, and the output shaft 7 extends outwardly through the third housing 13.

Each of the first, second, and third planetary gear trains G1, G2, and G3 comprises respectively a first, second or third sun gear S1, S2 or S3, which is disposed rotatably and coaxially to the input and output shafts 1 and 7; first, second, or third planetary pinions P1, P2 or P3, which mesh with the respective sun gear and rotate about their own axes while revolving around the respective sun gear; a first, second or third carrier C1, C2 or C3, which supports the respective planetary pinions rotatably and rotates therewith around the respective sun gear; and a first, second or third ring gear R1, R2 or R3, whose internal gear teeth mesh with the respective planetary pinions. The first planetary gear train G1 is single-pinion type, in which only one pinion gear P1 is provided between the sun gear S1 and the ring gear R1, while the second and third planetary gear trains G2 and G3 are double-pinion type, in each of which two pinion gears P2 or P3 are provided between the sun gear and the ring gear, respectively.

In this transmission, the input shaft 1 and the connecting shaft 4 are connected rotationally through the first connecting gear train 2 and 3, and the connecting shaft 4 and the third sun gear S3 are connected rotationally through the second connecting gear train 5 and 6. The first and second ring gears R1 and R2 are fixed to each other and are firmly retainable by a first brake B1, and they can be connected or disconnected to the input shaft 1 through a first clutch K1 while the input shaft 1 can be connected or disconnected to the first sun gear S1 through a third clutch K3. Furthermore, the first carrier C1 is fixed to the second sun gear S2, which is fixed to the output shaft 7. The third carrier C3 is permanently fixed with respect to the housing, and the third ring gear R3 can be connected or disconnected through a second clutch K2 to the second carrier C2, which is firmly retainable by a second brake B2.

With this construction, the shift control of the planetary gear transmission for establishing gear positions is performed by controlling the engagement and disengagement of the first, second and third clutches K1, K2 and K3 and the first and second brakes B1 and B2. More specifically, five forward speed ranges (LOW, 2ND, 3RD, 4TH, and 5TH) and one reverse speed range (REV) can be established by engaging and disengaging the clutches and the brakes in combination as shown in FIG. 5. It should be understood that the reduction gear ratio of each speed range depends on the numbers of teeth of the respective gears involved and that the ratio listed for each speed range in the table of FIG. 5 is given only as an example.

As shown in the table, each of the five speed ranges (LOW -5TH) for forward drive is established by engaging two of the engaging means, i.e., the clutches K1, K2 and K3 and the brakes B1 and B2. In addition, the shift to an adjacent speed range in either direction is performed by releasing one of the two engaging means and by engaging another respective engaging means, so the two engaging means are never released together nor engaged simultaneously to establish any speed range. Therefore, the shift control is simple.

Figure 6:
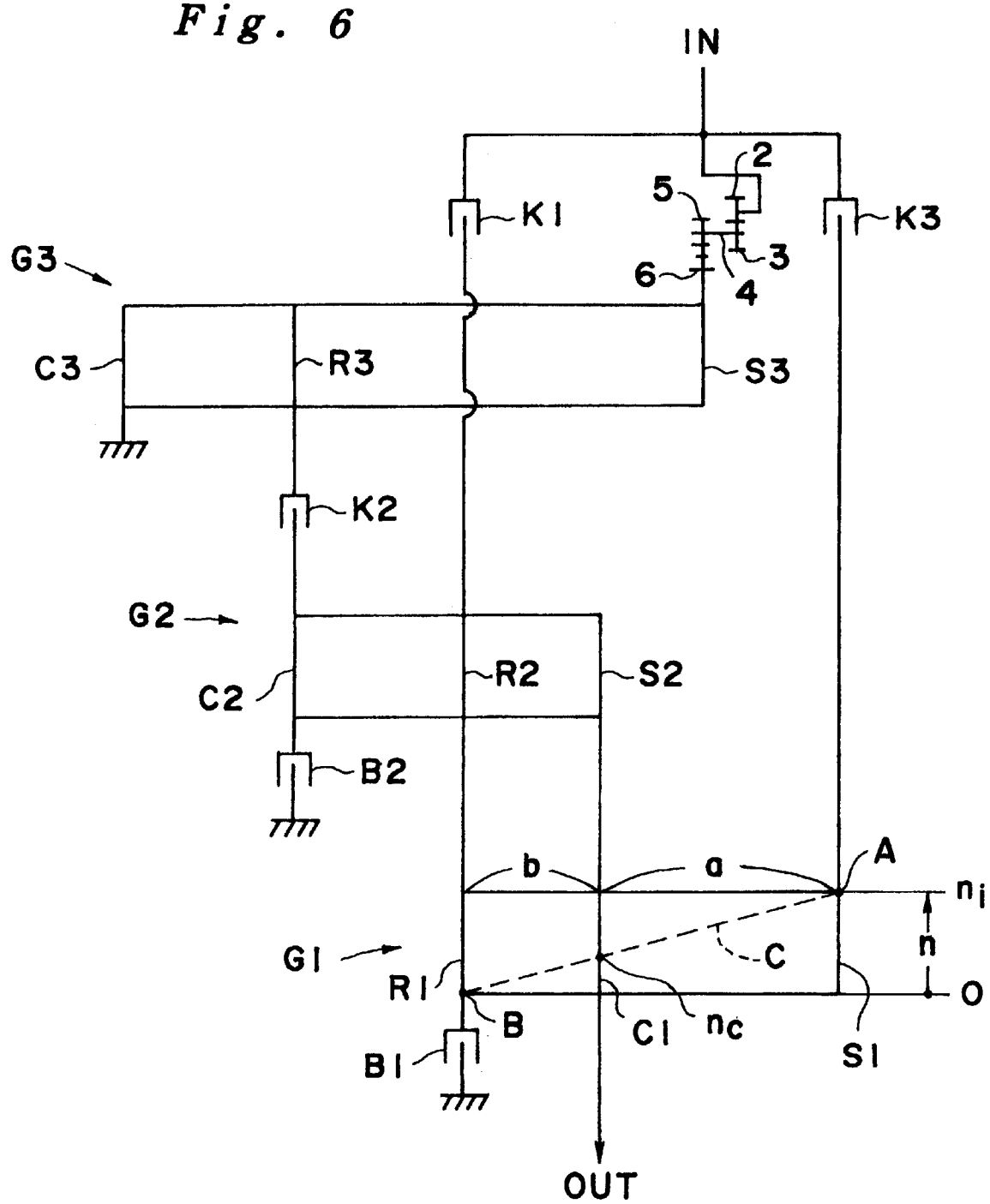
FIG. 6 is a velocity diagram showing the relation in rotational speed among the elements of the planetary gear transmission.

FIG. 6 is a velocity diagram which shows the relation in rotational speed among various elements of the planetary gear transmission. In this diagram, the velocities of the first, second, and third planetary gear trains G1, G2, and G3 are separately plotted in three groups. The vertical lines provided for each group represent the components of the respective planetary gear train, and the lengths of the vertical lines correspond to the rotational speeds of the respective components. Furthermore, the distances between the vertical lines representing the carrier and the sun or ring gear are proportional to the reciprocal of the number of teeth of the respective sun or ring gear.

For example, in the plot for the first planetary gear train G1, the three vertical lines represent the first sun gear S1, the first carrier C1, and the first ring gear R1, respectively from the right, and the upward lengths of these vertical lines indicate the rotational speeds "n" in the forward drive direction. The distance "a" between the vertical line representing the first sun gear S1 and the vertical line representing the first carrier C1 corresponds to the reciprocal (=1/Zs) of the number of teeth Zs of the first sun gear S1, and the distance "b" between the vertical line representing the first carrier C1 and the vertical line representing the first ring gear R1 corresponds to the reciprocal (=1/Zr) of the number of teeth Zr of the first ring gear R1. While the first sun gear S1 connected to the input shaft 1 by the engagement of the third clutch K3 rotates at the same rotational speed "ni" as the input shaft 1, if the first ring gear R1 is held firmly against rotation by the first brake B1, as shown in FIG. 6, the first carrier C1 will rotate at a rotational speed "nc" which is indicated by the point of intersection made by the vertical line representing the first carrier C1 and the line C that interconnects the point A indicating the rotating condition of the first sun gear S1 and the point B indicating the fixed condition of the first ring gear R1.

The second and third planetary gear trains G2 and G3 can be also described in the same manner. However, as these planetary gear trains G2 and G3 are double-pinion type, the rotational direction of the ring gears with respect to the sun gears is opposite to that of the first planetary gear train G1, which is single-pinion type. Therefore, in the velocity diagram, while the plot for the first planetary gear train G1 has the vertical line representing the carrier C1 between the vertical lines representing the sun gear S1 and the ring gear R1, the plots for the second and third planetary gear trains G2 and G3 have the vertical lines representing the sun gears S2 and S3 and the ring gears R2 and R3 on only one side of the vertical lines representing the carriers C2 and C3, respectively. The horizontal distances of the vertical lines are plotted as described above, corresponding to the reciprocals of the numbers of teeth of the respective sun and ring gears.

It should be noted that the members which can be interconnected and rotated in unison or at an identical rotational speed are plotted on one extending vertical line in the velocity diagram of FIG. 6. Thus, each of the components of the planetary gear trains is positioned on one of the six vertical lines. If the components located on one vertical line are together taken as one rotating member, then the vertical lines can be named "first rotating member, second . . . , and sixth rotating member", respectively from the left. With respect to these rotating members, the connections of the components of the transmission are summarized in FIG. 7, which also includes the ratios 1 of the numbers of teeth of the sun gears Zs to those of the ring gears Zr($\lambda$=Zs/Zr).

Figures 7, 8:
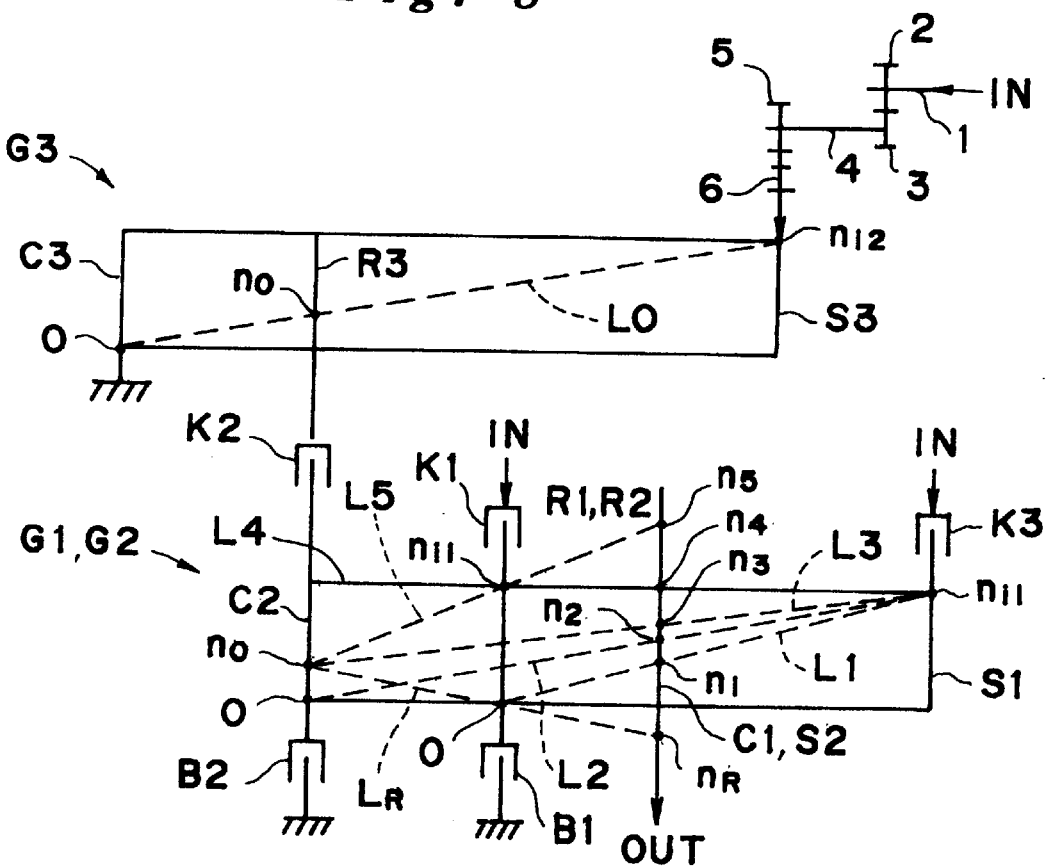
FIG. 7 is a table showing the relation of the rotational members of the planetary gear transmission, the relation being summarized from the velocity diagram.
FIG. 8 is another velocity diagram showing the relation in rotational speed among the elements of the planetary gear transmission.

Now, the reduction gear ratio, i.e., the ratio of the rotational speed of the output shaft 7 to the input shaft 1 will be described for each speed range by a graphical method with reference to the velocity diagram. In this transmission, the first and second ring gears R1 and R2 are fixed to each other, and the first carrier C1 and the second sun gear S2 are fixed to each other. As the two elements of the first and second planetary gear trains G1 and G2 are interconnected, the first and second planetary gear trains G1 and G2 operate as a unit. Therefore, the velocity diagram can be redrawn by integrating the plots for the first and second planetary gear trains as shown in FIG. 8.

In the third planetary gear train G3, which is disposed rather independently, the third carrier C3 is fixed stationary with respect to the housing. On the other hand, the third sun gear S3 is always connected rotationally to the input shaft 1 through the first and second connecting gear trains 2, 3, 5 and 6 and the connecting shaft 4, so the third sun gear S3 rotates at the rotational speed ni2 which corresponds with the product of the rotational speed ni1 of the input shaft 1 and the reduction gear ratio of the connecting gear trains. Therefore, the third ring gear R3 rotates at a rotational speed "n0"which is indicated in the figure by the point of intersection made by the vertical line representing the third ring gear R3 and the broken line L0 that connects the points indicating these conditions.

For the LOW range, the third clutch K3 and the first brake B1 are engaged as shown in FIG. 5. As a result, the first sun gear S1 rotates at the same rotational speed ni1 as the input shaft 1 while the first and second ring gears R1 and R2 are held stationary in the first and second planetary gear trains G1 and G2. As shown in the velocity diagram of FIG. 8, the first carrier C1 and the second sun gear S2, which are connected to the output shaft 7, rotate at a rotational speed n1 which is indicated by the point of intersection made by the vertical line representing these components and the dotted line L1. This rotational speed n1 is the rotational speed of the output shaft 7, i.e., the output rotational speed of the transmission.

In this case, as the second clutch K2 is disengaged, the third planetary gear train G3 does not affect the output rotational speed of the transmission at all. In other words, the third planetary gear train G3 is not involved in the determination of the reduction gear ratio of LOW range. Also, it is clear from this velocity diagram that the rotational speeds of all the respective components are less than the input rotational speed, so no component will experience over-rotation.

For the 2ND range, while the third clutch K3 is kept being engaged, the first brake B1 is disengaged, and the second brake B2 is engaged instead. As a result, while the first sun gear S1 is maintained rotating at the same rotational speed ni1 as the input shaft 1, the second carrier C2 is held stationary. As shown in the velocity diagram of FIG. 8, the rotational speeds of the respective components are determined by the points of intersection made by the vertical lines representing these components and the dotted line L2, and the output shaft 7 rotates at a rotational speed n2.

For the 3RD range, while the third clutch K3 is kept being engaged, the second brake B2 is disengaged, and the second clutch K2 is engaged instead. As a result, while the first sun gear S1 is maintained rotating at the same rotational speed ni1 as the input shaft 1, the second carrier C2 is made to rotate at the same rotational speed as the third ring gear R3. As mentioned above, in the third planetary gear train G3, the third ring gear R3 rotates at the rotational speed n0 as indicated in the figure by the point of intersection with the broken line L0. Therefore, the second carrier C2 rotates at the rotational speed n0, so the rotational speeds of the respective components of the first and second planetary gear trains are determined by the points of intersection with the dotted line L3 as shown in the velocity diagram, and the output shaft 7 rotates at a rotational speed n3.

For the 4TH range, while the third clutch K3 is kept being engaged, the second clutch K2 is disengaged, and the first clutch K1 is engaged instead. As a result, in addition to the first sun gear S1, the first and second ring gears R1 and R2 are made to rotate at the same rotational speed ni1 as the input shaft 1, and the first and second planetary gear trains G1 and G2 as a whole rotate at the same rotational speed ni1 as the input shaft 1. As shown in the velocity diagram, the rotational speeds of the respective components are determined by the points of intersection with the real line L4, and the output shaft 7 rotates at a rotational speed n4.

For the 5TH range, while the first clutch K1 is kept being engaged, the third clutch K3 is disengaged, and the second clutch K2 is engaged instead. As a result, while the first and second ring gears R1 and R2 are maintained to rotate at the same rotational speed ni1 as the input shaft 1, the second carrier C2 is made to rotate at the same rotational speed as the third ring gear R3, i.e., at the rotational speed n0 as mentioned previously. As shown in the velocity diagram, the rotational speeds of the respective components are determined by the points of intersection with the broken line L5, and the output shaft 7 rotates at a rotational speed n5.

For the REV range (rearward drive), the second clutch K2 and the first brake B1 are engaged. As a result, the first and second ring gears R1 and R2 are held stationary, and the second carrier C2 rotates at the same rotational speed n0 as the third ring gear R3. As shown in the velocity diagram, the rotational speeds of the respective components are determined by the points of intersection with the broken line LR, and the output shaft 7 rotates at a rotational speed nR.

In the manner described above, the reduction gear ratio, i.e., the ratio of the input rotational speed to the output rotational speed, for each speed range is determined. It is clear from the relations of the rotational speeds defined by the lines L1 through L5 and LR for the speed ranges that no component will rotate at a rotational speed which is well beyond the input rotational speed in any speed range, so there is no problem of any component ever experiencing over-rotation (especially, there is no problem of pinion gear over-rotation). In the establishment of a forward drive range, the shift to an adjacent speed range is performed by releasing only one engaging means and by engaging another engaging means as shown in FIG. 5, so the shift control is simple.

Furthermore, the reduction gear ratios for the LOW, 2ND and 4TH ranges are determined by the factors of only the first and second planetary gear trains G1 and G2 while those for the 3RD, 5TH and REV ranges are determined in combination with the third planetary gear train G3. Therefore, the gear ratios for the 3RD, 5TH and REV ranges are independently alterable only by changing the gear ratio of the third planetary gear train G3. Thus, there is a relatively large degree of freedom in deciding the reduction gear ratios.

Figure 9:
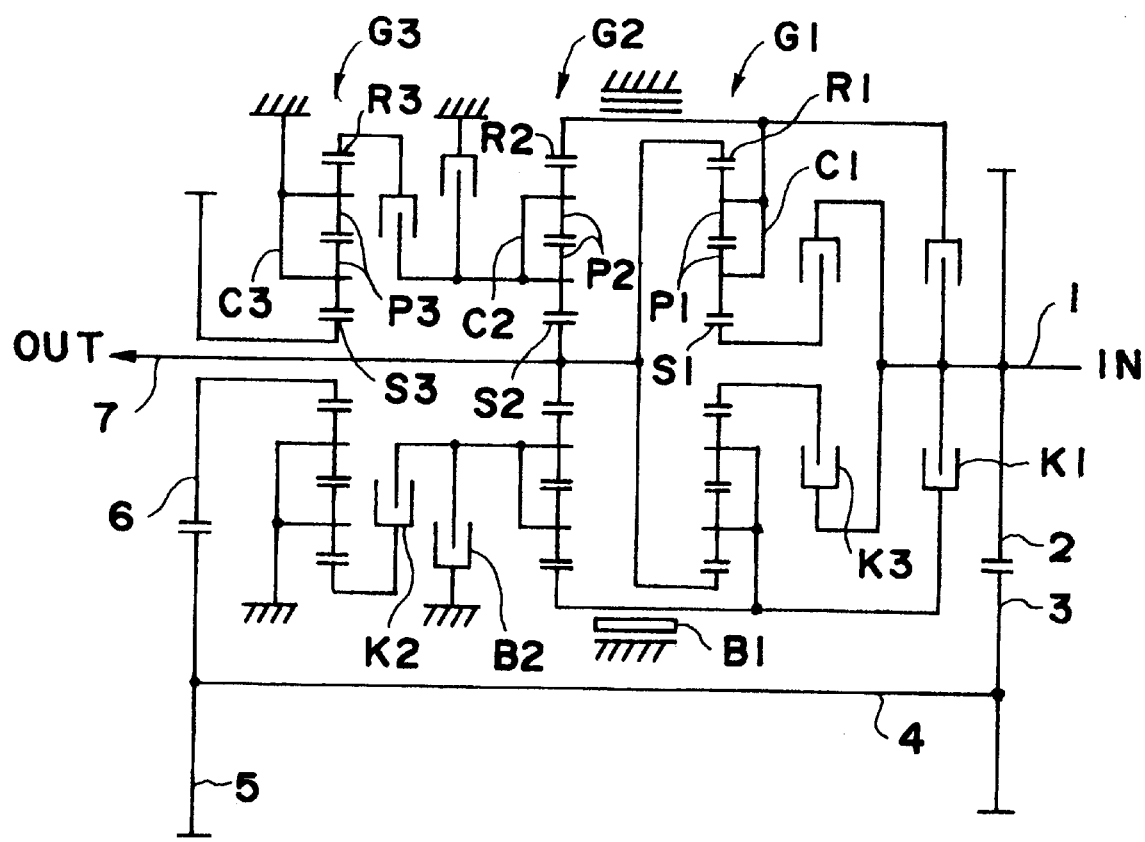
FIG. 9 is a skeleton diagram showing the power- transmission routes of another planetary gear transmission according to the present invention.

The above transmission has been described as an example of the planetary gear train according to the present invention. The transmission of the present invention can be also constructed as shown in FIG. 9, comprising first, second, and third planetary gear trains G1, G2, and G3, which are disposed coaxially with, in parallel with and adjacent to one another; a connecting shaft 4, which extends parallel with the axis of the planetary gear trains; a first connecting gear train 2 and 3 which is provided at one end of the connecting shaft 4; and second connecting gear train 5 and 6 which is provided at the other end of the connecting shaft 4.

Each of the first, second, and third planetary gear trains G1, G2, and G3 comprises respectively a first, second or third sun gear S1, S2 or S3, which is disposed rotatably and coaxially to the input and output shafts 1 and 7; first, second, or third planetary pinions P1, P2 or P3, which mesh with the respective sun gear and rotate about their own axes while revolving around the respective sun gear; a first, second or third carrier C1, C2 or C3, which supports the respective planetary pinions rotatably and rotates therewith around the respective sun gear; and a first, second or third ring gear R1, R2 or R3, whose internal gear teeth mesh with the respective planetary pinions. In this case, all the planetary gear trains G1, G2 and G3 are double- pinion type, in each of which two pinion gears P1, P2 or P3 are provided between the sun gear and the ring gear, respectively.

In this transmission, the input shaft 1 and the connecting shaft 4 are connected rotationally through the first connecting gear train 2 and 3, and the connecting shaft 4 and the third sun gear S3 are connected rotationally through the second connecting gear train 5 and 6. The first carrier C1 and the second ring gear R2 are fixed to each other, and they are connected or disconnected to the input shaft 1 through a first clutch K1 and are firmly retainable by a first brake B1. Furthermore, the input shaft 1 can be connected or disconnected to the first sun gear S1 through a third clutch K3, and the first ring gear R1 is fixed to the second sun gear S2, which is fixed to the output shaft 7. Moreover, the third carrier C3 is permanently fixed with respect to the housing, and the third ring gear R3 can be connected or disconnected through a second clutch K2 to the second carrier C2, which is firmly retainable by a second brake B2.

With this construction, the shift control for establishing a speed range in the planetary gear transmission is performed by controlling the engagement and disengagement of the first, second and third clutches K1, K2 and K3 and the first and second brakes B1 and B2. Specifically, five forward speed ranges (LOW, 2ND, 3RD, 4TH, and 5TH) and one reverse speed range (REV) can be established by engaging and disengaging the clutches and the brakes in combination as shown in FIG. 5. Details of this control are not given here because the specific controls performed are identical to those of the previous example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A planetary gear transmission comprising first, second and third planetary gear trains which are disposed coaxially with one another and respectively in this order from an input member, each planetary gear train including a sun gear element, a carrier element and a ring gear element, wherein two elements of said first planetary gear train are each disengageably connected to said input member through clutching means while the sun gear element of said second planetary gear train is fixed to an output member; and said planetary gear transmission further comprising:

a connecting shaft which is disposed away from and in parallel with an axis of said first, second and third planetary gear trains;

a first connecting gear train which connects one end of said connecting shaft to said input member; and a second connecting gear train which connects other end of said connecting shaft to the sun gear element of said third planetary gear train.

2. The planetary gear transmission as set forth in claim 1 wherein:

said input member is connected through a torque converter to an output shaft of an engine.

3. The planetary gear transmission as set forth in claim 1 wherein:

said first connecting gear train comprises a first drive gear which is fixed to said input member and a first driven gear which is fixed to the one end of said connecting shaft to mesh with said first drive gear; and said second connecting gear train comprises a second drive gear which is fixed to the other end of said connecting shaft and a second driven gear which is disposed coaxially with and fixed to the sun gear element of said third planetary gear train, to mesh with said second drive gear.

4. The planetary gear transmission as set forth in claim 1 wherein:

said first planetary gear train is a single- pinion type planetary gear train; and said second and third planetary gear trains are double-pinion type planetary gear trains.

5. The planetary gear transmission as set forth in any of claims 1 through 4 wherein:

said first, second and third planetary gear trains include first, second and third sun gear elements, first, second and third carrier elements and first, second and third ring gear elements, respectively;

said first and second ring gear elements are fixed to each other, are disengageably connected to said input member through first clutching means and are fixedly retainable by first braking means;

said second carrier element is disengageably connected to said third ring gear element through second clutching means and is fixedly retainable by second braking means;

said first sun gear element is disengageably connected to said input member through third clutching means;

said first carrier element is fixed to said output member; and said third carrier element is fixed stationary.

6. The planetary gear transmission as set forth in any of claims 1 through 4 wherein:

said first, second and third planetary gear trains include first, second and third sun gear elements, first, second and third carrier elements and first, second and third ring gear elements, respectively;

said first carrier element and said second ring gear element are fixed to each other, are disengageably connected to said input member through first clutching means and are fixedly retainable by first braking means;

said second carrier element is disengageably connected to said third ring gear element through second clutching means and is fixedly retainable by second braking means;

said first sun gear element is disengageably connected to said input member through third clutching means;

said first ring gear element is fixed to said output member; and said third carrier element is fixed stationary.

* * * * *